United States Patent [19]

Egly et al.

[11] Patent Number: 4,801,004
[45] Date of Patent: Jan. 31, 1989

[54] ARTICULATED MAGNETIC DISK STORAGE CASE

[76] Inventors: Robert A. Egly, 31 Belcourt South, Newport Beach, Calif. 92660; Patrick Sullivan, 1752 Brookshire Ave., Tustin, Calif. 92680

[21] Appl. No.: 62,640

[22] Filed: Jun. 12, 1987

Related U.S. Application Data

[63] Continuation of Ser. No. 927,069, Nov. 4, 1986, abandoned.

[51] Int. Cl.⁴ .............................................. B65D 85/57
[52] U.S. Cl. .................................. 206/45.13; 206/444; 220/339
[58] Field of Search ............... 206/307, 309, 211, 312, 206/313, 387, 444, 45.13, 45.18; 220/339

[56] References Cited

U.S. PATENT DOCUMENTS

| | | | |
|---|---|---|---|
| 4,225,038 | 4/1980 | Egly | 206/45.18 |
| 4,356,918 | 11/1982 | Kahle | 206/444 |
| 4,369,879 | 1/1983 | Egly et al. | 206/45.18 |
| 4,449,628 | 5/1984 | Egly et al. | 206/45.18 |
| 4,478,335 | 10/1984 | Long et al. | 206/444 |
| 4,496,048 | 1/1985 | Sykes | 206/387 |
| 4,496,050 | 1/1985 | Kirchner et al. | 206/444 |
| 4,508,217 | 4/1985 | Long et al. | 206/444 |
| 4,615,445 | 10/1986 | Stocchiero | 206/444 |
| 4,634,001 | 1/1987 | Wakelin | 206/444 |
| 4,655,342 | 4/1987 | Brauner et al. | 206/45.18 |

FOREIGN PATENT DOCUMENTS 0127974 12/1984 European Pat. Off. ............ 206/387

Primary Examiner—Jimmy G. Foster
Attorney, Agent, or Firm—George F. Bethel; Patience K. Bethel

[57] ABSTRACT

A magnetic disk storage case, having a boxlike portion with side and front walls, hinged by means of a binding to a top that overlies the boxlike portion. Attached to the binding is an articulated support ledge or shelf which is molded to the binding as well as the boxlike portion and the top in one injection molding process. The ledge or shelf is provided with two lateral tabs which extend outwardly through openings within two wall bracket portions depending from the top so as to allow the ledge to move backwardly and forwardly with the tabs being secured for their respective movement within the openings. This permits the ledge to be moved to a limited degree for expanding the space between the ledge and the interior surface of the top so as to provide greater access to magnetic memory disks stored on the ledge and held within the case.

13 Claims, 3 Drawing Sheets

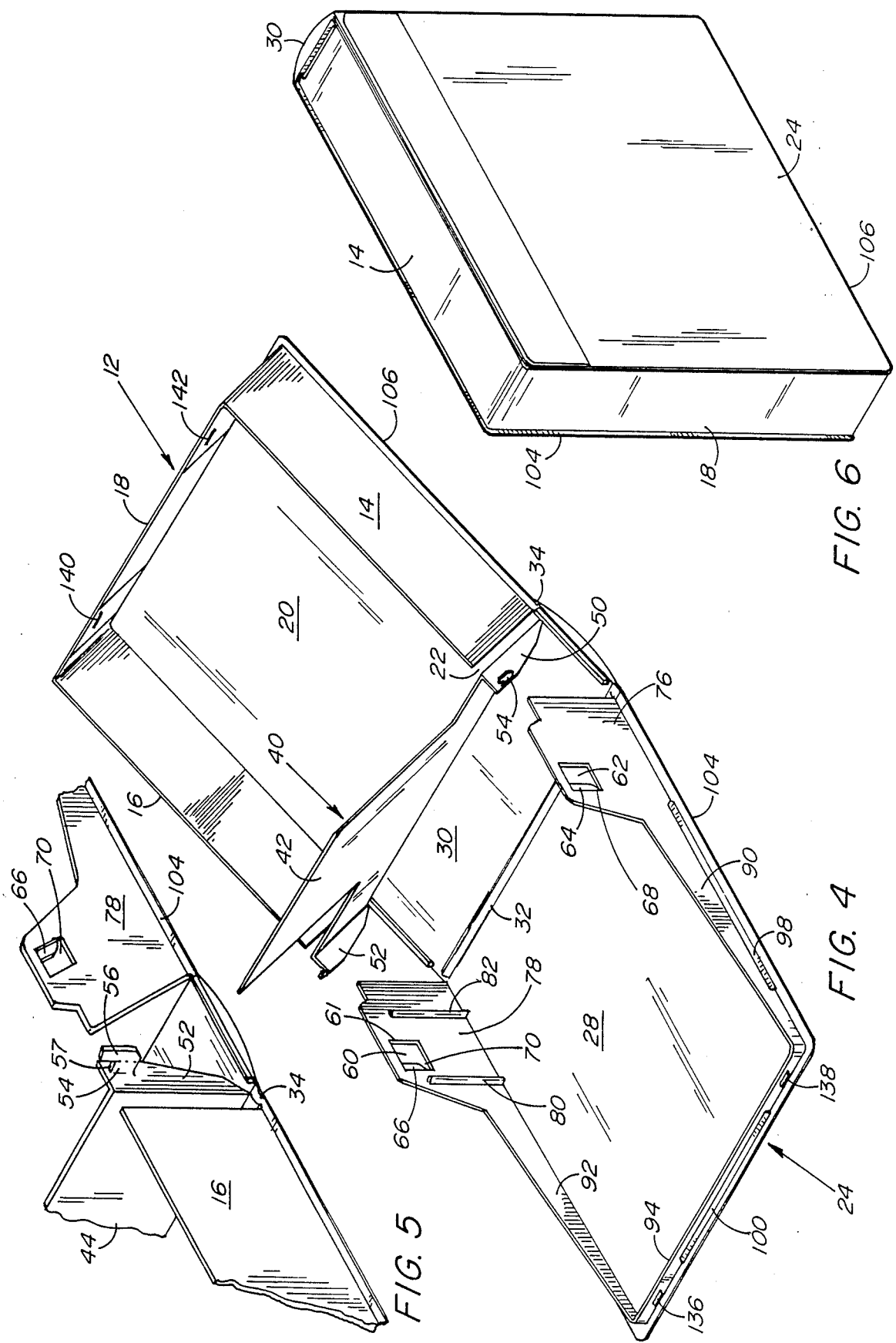

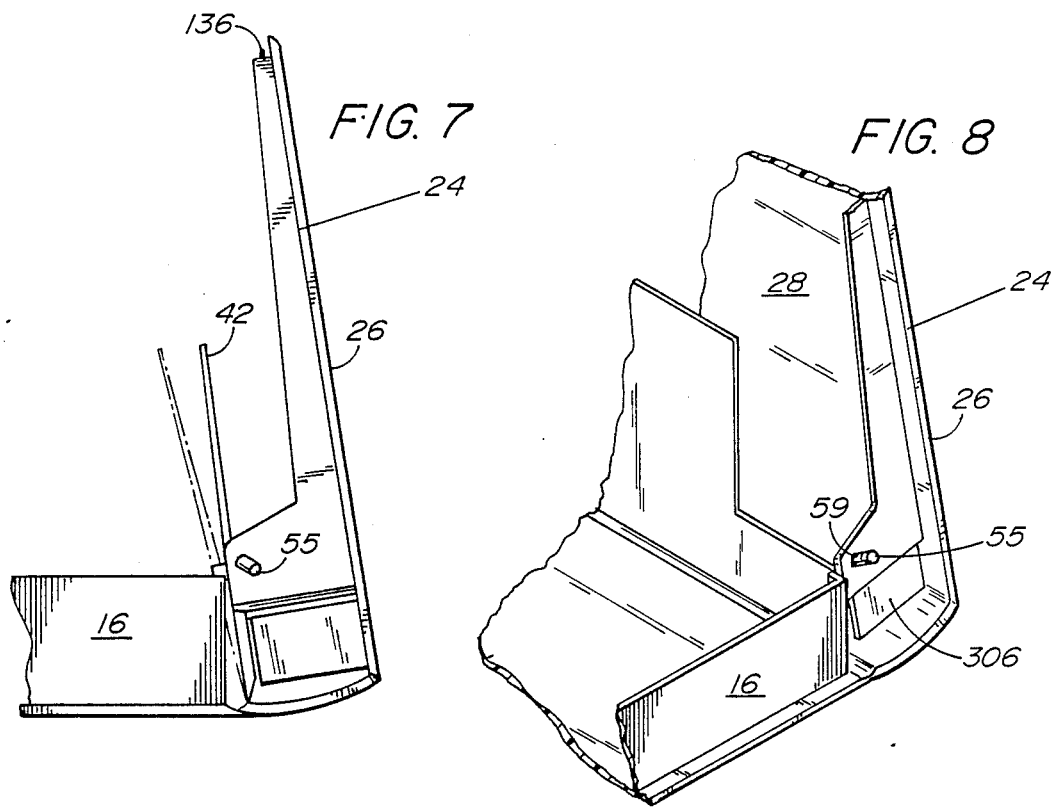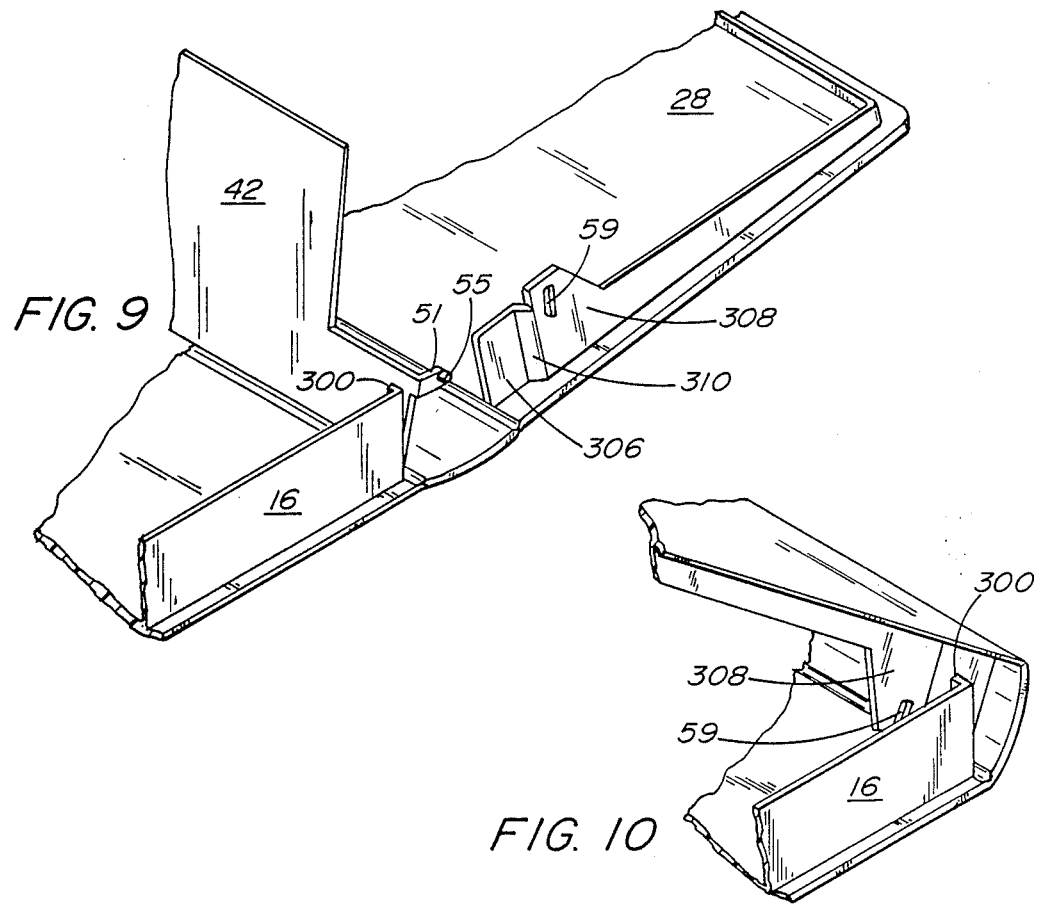

ARTICULATED MAGNETIC DISK STORAGE CASE

This is a continuation of application Ser. No. 927,069 filed 11/4/86, now abandoned.

BACKGROUND OF THE INVENTION

1. FIELD OF THE INVENTION

The field of this invention lies within the field of storing magnetic memory items. More particularly, it involves the field of storing magnetic memory disks such as those disks known as flexible or floppy disks that are used with computer disk drives.

2. THE PRIOR ART

The prior art with regard to storing flexible magnetic disks or floppy disks, incorporates a number of patents which the inventor hereof has previously invented and patented. These patents comprise U.S. Pat. Nos. 251,273, 4,225,038, 4,289,235, 4,369,879 and 4,449,628.

The foregoing U.S. patents are directed toward holding magnetic memory disks in a boxlike container having a ledge or a shelf. This invention incorporates many of the features of the foregoing prior art, except it overcomes some of the problems of the prior art with regard to providing an articulated ledge, shelf or tab upon which the magnetic memory disk rests.

In particular, in the prior art the ledge upon which the disks normally rest is a fixed ledge. This ledge confines the disks in some measure without allowing ready access thereto as in this invention. This invention has a flexible shelf or ledge that can move backwardly and forwardly within a stop opening which secures a pair of tongues therein. The tongues therein are hooked into the interior of the stop opening by means of upright extensions or hooks. This thereby allows the ledge to move backwardly and forwardly with the upright extensions or hooks within the stop openings so that the ledge can move forward to allow for greater access to the magnetic memory disks therein.

Upon closure of the top with the ledge therein, the magnetic memory disks are secured by the ledge and the ledge is caused to move with its articulated capability backwardly into index within the stop opening. This allows for a seating of the ledge and a placement of the entire top with the ledge within the boxlike portion of the case.

It will be understood that this invention provides for improvements over the prior art as set forth in the following specification and summary of the invention and the claims directed thereto.

SUMMARY OF THE INVENTION

In summation, this invention comprises a magnetic memory case having a bottom boxlike portion and a top or lid with a ledge or shelf attached to said top or lid which moves in an articulated manner with controlled movement by a pair of tongues extending therefrom which are received within stop openings allowing movement backwardly and forwardly to the extent of said openings.

More particularly, the invention comprises a one piece injection molded case having a bottom portion which is a boxlike portion having side and front walls extending upwardly therefrom for closure of the case. The side opposite from the front wall has a back wall or binding which extends in a single plastic form to a top or lid portion. The top or lid portion has two brackets extending therefrom which have openings or stops which receive tongues from a ledge or shelf member. The tongues extending therefrom have upward hooklike members that allow for seating within a stop portion of the opening, while at the same time secure the side of the ledge thereinto.

The foregoing allows for movement of the ledge or shelf extending therefrom into an expanded relationship away from the interior of the top of the case so as to provide for greater access of the magnetic memory disks stored therein. The foregoing articulated movement is enhanced by virtue of the fact that upon replacement of the top and the ledge into the boxlike portion, the ledge is moved backwardly in its articulated movement into the closer position to the top so as to accommodate more compact storage of the disks stored on the ledge and maintained within the case.

BRIEF DESCRIPTION OF THE DRAWINGS

The invention will be more clearly understood by reference to the description below taken in conjunction with the accompanying drawings wherein:

FIG. 4 shows a laid-out view of the case prior to the time it is assembled and in the form of a plan open view thereof.

FIG. 5 shows a detailed side elevation view in fragmented form as seen from the left side of FIG. 4 detailing the upright brackets, the tongues and the other portions of the means for assembling the invention and the opening which provides the articulated movement.

FIG. 6 shows a perspective view of the container looking from the top as closed onto the bottom portion and supported on a side wall thereof.

FIG. 7 shows a fragmented side elevation view of an alternative embodiment of this invention.

FIG. 8 shows a fragmented perspective view of the alternative embodiment of this invention.

FIG. 9 shows a perspective view that has been fragmented of the alternative embodiment of this invention, with the different portions thereof disassociated from each other prior to assembly.

FIG. 10 shows the alternative embodiment shown in FIGS. 7 and 9 in a position being closed.

DESCRIPTION OF THE PREFERRED EMBODIMENT

Figure 1:
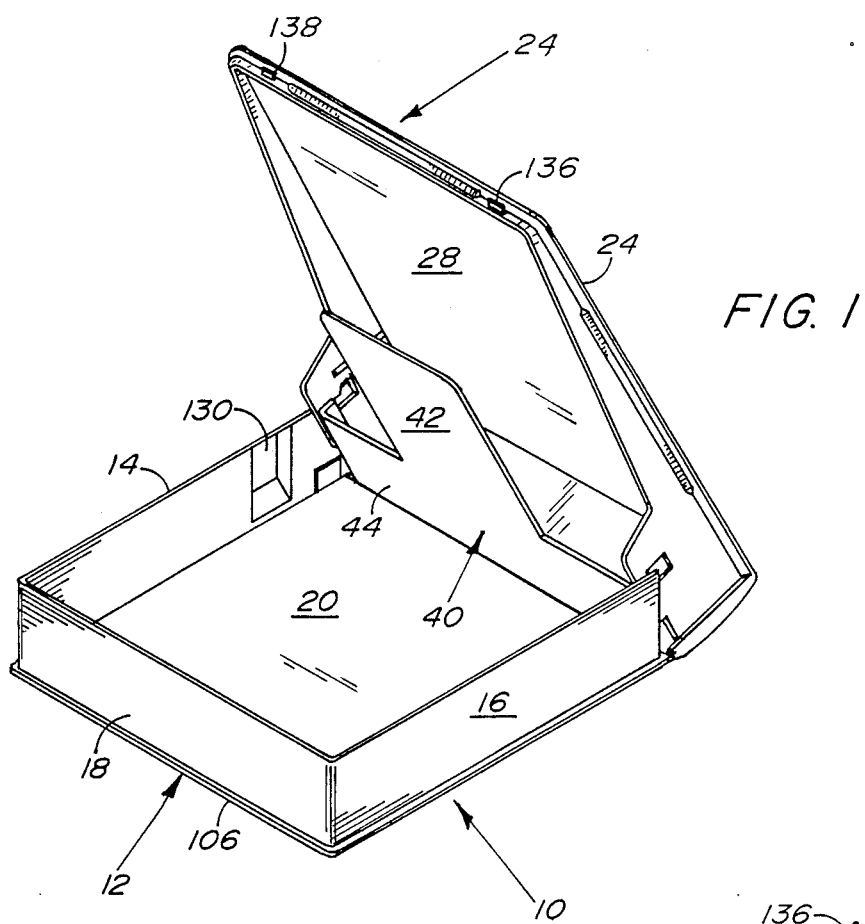
FIG. 1 is a perspective view of the magnetic disk case of this invention.

Looking at FIG. 1, it can be seen wherein a case 10 is shown having a box portion or bottom 12. The box portion or bottom 12 comprises a pair of side walls 14 and 16 respectively on the left and right side looking at the figure, but which can be presented in any particular manner. The two side walls 14 and 16 are interconnected by a front wall 18.

A bottom portion 20 is shown filling in the walls 14, 16 and 18 to form a boxlike portion 12 with the upstanding walls 14, 16 and 18. The upstanding walls 14, 16 and 18 can be formed in any particular manner so as to effectuate the object of the invention. In this particular instance, they have been injection molded of plastic on a continuous basis so as to form a continuous boxlike portion 12. The respective side walls 14 and 16 and front wall 18 can be seen in FIG. 4 in an opened condition providing a rear space 22. Thus, the entire boxlike portion is not closed by the walls 14, 16 and 18, but is allowed to be open at one end thereof in the form of space 22.

A top portion 24 is shown having a top 26 with an interior surface 28 thereof. The top portion 24 is joined by means of a binding 30 that is provided with living hinges 32 and 34. The living hinges 32 and 34 specifically are directed toward the concept of joining the top portion 24 to the bottom box portion 12. The binding, when assembled into the walls 14 and 16 of the bottom 12, provide a closure of the space 22 therebetween.

The living hinges 32 and 34 are formed by being made of very small webs. The small webs can be exemplified by the walls 34 as seen in the form of a thinner membrane extending between the binding or the hinge portion 30 and the bottom box portion 20.

The entire bottom box portion 20, top portion 24 and binding 30 with the webs or membranes 32 and 34 therebetween are injection molded out of a single injection molding. This provides for a continuously injection molded item made of one piece of plastic without the requirement of various assembly processes in order to weld, adhere, or provide the adhesion of one member to the other. Furthermore, the end result is one wherein a completed product is manufactured that has inherent springiness and resiliency that is necessary to make a completed product.

Extending proximate the web portion 34 is a ledge or shaft 40. The ledge or shelf 40 is formed as an inverted T member. The inverted T member has an upright 42 or tab. A transverse portion 44 forms the lower portion of the inverted T 40. This transverse portion 44 effectuates a bottom ledge for holding magnetic memories therein while at the same time allowing the tab or upright portion 42 to be bent forwardly. However, it should be understood that any type of flexible or non-flexible ledge or shelf 40 can be utilized in this particular embodiment. In fact, various configurations wherein a rounded ledge, a rectangular ledge, a depending portion, or any other member can be utilized for substituting the ledge or shelf 40 of the transverse T in its inverted form.

Looking more particularly at the inverted T it can be seen that at the ends of the transverse portion are two extending uprights or brackets 50 and 52. The extending upright brackets 50 and 52 have an extension in the form of an extending hooklike member 54 leading therefrom. The extending hooklike member 54 terminates in an upstanding hook area 56, having a loop or hook opening 57.

The upstanding hook area 56 provides for the brackets 50 and 52 to be seated within stop openings 60 and 62. The stop openings 60 and 62 are such wherein they receive the upright or upstanding hooks 56 and extension members 54 and 56 so as to allow them to move within the stop openings 60 and 62 while at the same time being retained from movement thereby. This allows the ledge or shelf 40, as will be described hereinafter, to move backwardly and forwardly and be articulated in the two particular modes shown in FIGS. 2 and 3.

The stop openings 60 and 62 have a notched element or insert 64 and 66 providing notches respectively 68 and 70. These notches 68 and 70 allow for a locking of the upright portion of the hook 54 on the outside of the opening, while at the same time allowing the depending lower portion of the hook to be inserted and associated with the notches 68 and 70 for securement therein.

The openings 60 and 62 are provided within upright wall brackets or extending members 76 and 78. The upright wall brackets 76 and 78 respectively have side braces or reinforcement flanges 80 and 82 on the interior thereof. These reinforcement flanges 80 and 82 allow for the upright wall brackets to be held in firm juxtaposition while at the same time having sufficient flexibility to assemble the entire unit by spreading the brackets 76 and 78 apart and permitting the tabs or upright hooks 54 to be inserted therein with the upstanding hook 56 lying on the outside of the wall brackets 76 and 78.

The top portion 24 comprises the wall brackets 76 and 78 that taper downwardly to angular wall reinforcements 90 and 92 on either side. The edge walls 90 and 92 terminate in a small upstanding wall 94 at what would be the front of the top in the closed condition that would seat against front wall 18.

The foregoing angular edge walls 90 and 92 are such wherein they allow for a seating of the angular walls 90 and 92 within the interior of the boxlike portion 20.

In order to provide for a tightened indexing of the top portion 28 against the interior portion of the walls 14, 16, and 18, a bead 98, 100 and a similar bead against wall 92 are utilized to provide for indexing. Also, a flange 104 extends around the top portion 28. A second flange 106 extends around the box portion 20 so as to allow for rigidity as well as seating of the top portion 28 against the top surface of walls 14, 16 and 18. This thereby accommodates the overall closure so that a tightened juxtaposed fitting is provided between the top portion 28 and the bottom boxlike portion 20 with a flange 104 and 106 circumscribing the top and bottom portions 24 and 12 respectively.

The top portion 24 when folded into the interior walls of the boxlike portion 12, has the hooks 56 extending from the openings 60 and 62. Accordingly, they slide against the interior of the walls 14 and 16. In order to accommodate them, a recess or groove 130 is implaced within either wall so that as the top portion 24 moves downwardly, the hooks 56 extending therefrom, move into the groove 130. This thereby allows for the placement of the hooks 56 into the grooves 130 without unduly expanding the side walls 14 and 16.

The top portion 24 locks into the bottom side walls in a resilient manner by means of a certain closure means. The closure means comprise a pair of tangs, barbs, or protrusions 136 and 138 that can be respectively seated in grooves 140 and 142 in the front wall 18. This thereby allows for a seating and a tightened securement of a top portion 24 into the boxlike portion 12.

The entire case 10 is put together by expanding the wall brackets 76 and 78 outwardly and implacing the extensions 54 with the hooks 56 interiorly of the openings 60 and 62. This allows for an engagement thereof and a securement so that the upstanding hooks 56 seat with their depending portions or hook openings 57 into the surrounding wall of the stops or openings 60 and 62 and are hooked thereto. In this manner, the entire case 10 is assembled.

Figure 2:
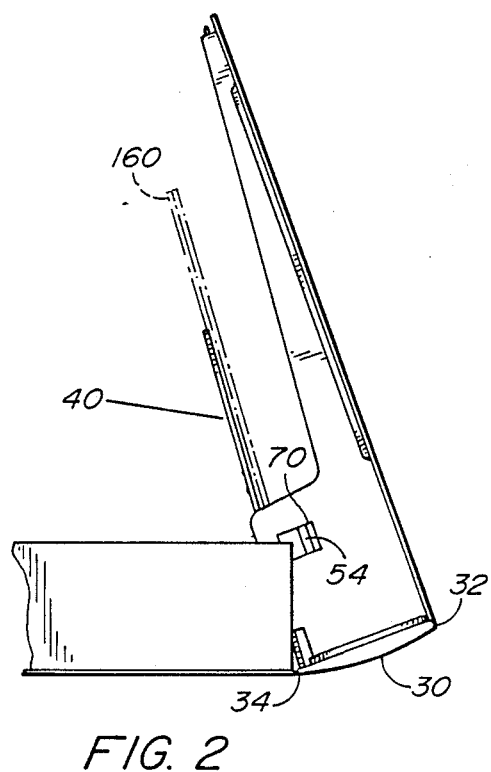
FIG. 2 is a side elevation view as fragmented through a portion of the bottom box portion showing the ledge holding magnetic disks thereon.
Figure 3:
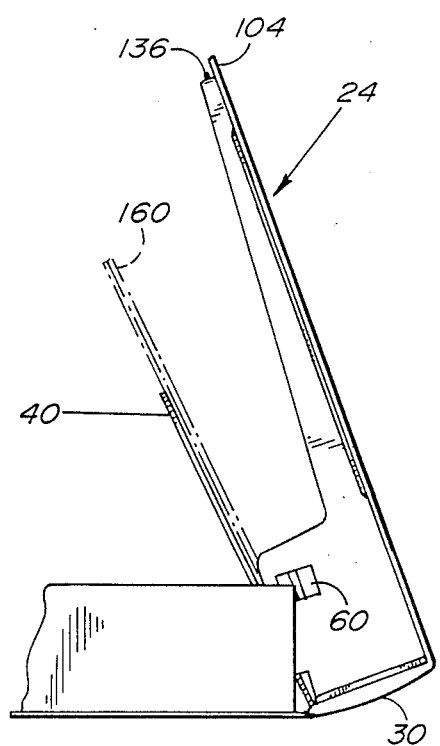
FIG. 3 is a view similar to FIG. 2 of the fragmented side elevation view of the case of this invention with the ledge being pushed forwardly expanding the space between the ledge and the interior of the top of the boxlike member in an articulated forward movement of the ledge as guided within the stop opening.

As seen in FIGS. 2 and 3, the ledge or shelf 40 is shown in a first position without having been expanded or articulated forwardly. The extensions 54 with the hook 56 is hooked upwardly into the notch 70 and is in the closer position to the top interior portion 28. When the ledge or shelf 40 is pulled forwardly, the extension 54 with the hook 56 moves forwardly and rests against the leading surface 61 of the opening 60 so as to provide for a greater space between the ledge 40 and the interior of the top portion 28. The foregoing articulated action allows for a greater access to magnetic disks 160 which have been shown in dotted form overlying and stored on the ledge or shelf 40. The entire structure is thus expanded to allow greater access of the magnetic media 160 by ledge or shelf 40 being moved forwardly to provide for greater space and opening therein.

The ledge or shelf 40 can be moved backwardly against the top portion 28 in any suitable manner so that the extension 54 and the hook 56 are latched in the notches 68 and 70. In the alternative, when the top portion 24 is closed downwardly, it allows for a movement of the ledge 40 backwardly against the interior of the top portion 28 so as to allow for a seating thereof in juxtaposition with the magnetic media 160 underlying the top portion 28.

Looking more particularly at FIGS. 7 through 10, it can be seen that an alternative embodiment is shown. The alternative embodiment shows the inverted T ledge 42 which has two extending lateral portions terminating in two angle members 51, and an angle member not shown that would be respectively substituted for upright brackets 50 and 52 of the prior embodiment. The angle member 51 has a pin 55 extending therefrom. The pin 55 is seated within an arcuate opening 59. The arcuate opening 59 receives the pin 55 therein so that it can move within the frame of reference of the arc periphery. In effect, the pin 55 moves backwardly and forwardly in an arc so as to establish a frontal and rear position of the inverted T 42. This can be seen in FIG. 7.

The bracket 51 and matching bracket that would be substituted for the upright brackets 50 and 52 are formed in any suitable manner so as to allow the insertion of the pin 55 into the arcuate opening 59.

In addition to the foregoing, an alternative bracing is provided for the end of the walls 14 and 16 in the form of an upright flange or rib member 300. The upright flange or rib member 300 is formed as a brace or enlarged portion as shown at the end of the wall 16 and also at the end of the wall 14 so that it limits the flex of the walls 14 and 16 interiorly as well as exteriorly. In addition thereto, the configuration allows for a seating and insertion of the top as will be described hereinafter.

The arcuate slot or opening 59 on either side is implaced within a pair of brackets, or upright wall members, analogous to the upright wall brackets 76 and 78. However, in this particular embodiment the upright bracket is provided with an angular wall portion 306 that extends from the bracket 308, analogous to bracket 78. This bracket 308 analogous to bracket 78 is stepped or angled at a step 310 and terminates in an offset portion 306 from the angled portion 310 extending therefrom.

This angled or stepped portion 310 allows for a passage of the bracket 308 and angled bracket portion 306 to pass interiorly of the inside of the walls 14 and 16 and be secured therein by being enclosed and passing the upright brace 300. Accordingly, the box top 24 can be closed effectively with the indentation provided by the angular orientation of the bracket 306 extending interiorly of the upright 300 and allowing insertion of the entire bracket 308 between walls 14 and 16 as it extends across the interior portion of the top 28.

The other details of the invention are substantially the same and do not vary from elements as shown in the configuration.

As can be seen, the articulated ledge 40 that is supported for movement in a resilient manner backwardly and forwardly provides greater access to magnetic media 160. It is a substantial step over the art. It is believed that this, in combination with the other portions of the invention, should be read broadly in light of the following claims.

We claim:

1. A case formed of a continuously molded plastic material for magnetic memory disks that are used with disk drives comprising:
    a boxlike member having side walls thereto;
    a top portion hinged to said boxlike member having a hinge between said boxlike member and said top portion formed as a binding with a continuous portion of the boxlike portion and the top portion in the form of a living hinge on either edge of said binding formed as a web of the plastic material and that is of a lesser thickness than said top portion and side walls;
    a ledge attached to said boxlike portion by said binding and that is hinged by a living hinge on said binding for arcuate movement on said binding and with respect to said top portion in spaced relationship providing a space therebetween that can be expanded and contracted by moving said ledge radially inwardly and outwardly on its living hinge on said binding; and,
    means for limiting the movement of said ledge in the form of extensions from said ledge extending into openings provided in connected relationship to said top portion so as to allow said ledge to move with said extensions between the limits of the openings.

2. The case as claimed in claim 1 wherein:
    said top portion, said bottom portion, and said ledge are all formed as one continuous piece of plastic in an injection molding process.

3. A case for magnetic disks as claimed in claim 1 wherein:
    said openings are arcuate openings.

4. The case as claimed in claim 3 further comprising:
    pins extending from the ledge for engagement within said arcuate openings for articulated movement therein.

5. The case as claimed in claim 4 further comprising:
    upright wall brackets formed as brackets having an angular offset wall portion.

6. The case as claimed in claim 1 comprising:
    an upright brace at the end of each respective wall formed as a ridge extending along the end of each edge of each respective wall.

7. A magnetic disk storage case formed as a single injection molded plastic item comprising:
    a boxlike portion having sidewalls and a front wall;
    a top portion;
    a binding extending between said top portion and said bottom portion connected therebetween with living hinges which are formed as a thin web of plastic material thinner than said sidewalls and said top portion;

a shelf connected to said binding by a living hinge formed as a web of lesser thickness than said shelf along a portion thereof and formed as a unitary injection molded part with said boxlike portion of said top and said shelf;

members on either side of said top portion extending adjacent said shelf;

openings within said members; and, extensions from said shelf extending therefrom into said openings wherein said extensions are lesser in dimension than said openings to permit articulated movement of said extensions within said openings which provide limited movement to said extensions so that said shelf will move in an arcuate radially articulated manner on its living hinge to the extent of said openings.

8. The case as claimed in claim 7 further comprising:

spaces within the sides of said boxlike portion for receiving the extensions from said shelf as said top portion and shelf are closed onto said bottom portion.

9. The case as claimed in claim 8 further comprising:

flange means surrounding the top of said case at least in part for seating within the walls of said boxlike portion; and, lock enclosure means formed as extensions from said top portion into openings within the wall of said bottom portion.

10. The case as claimed in claim 9 wherein:

said extensions from said shelf are formed as hooklike members extending into said openings of said members to hook the shelf into connected relationship therein.

11. An articulated shelf in combination with a case for storing magnetic disks wherein said shelf is used for the storage of said magnetic disks and said case comprises a boxlike portion and a top portion having an injection molded one piece form with said shelf and further comprising a hinged binding having a hinge formed with the binding but of lesser thickness than the binding between said top portion and said bottom portion all formed as a singly molded item wherein the improvement comprises:

a shelf hinged to said hinged binding between said top end boxlike portion;

wall brackets extending from said top portion having openings therein; and, extensions from said shelf which extend into the openings of said wall brackets and are of a lesser dimension than said openings for seating therein and providing for articulated movement of said extensions of said shelf to the extent of said openings so that said shelf can expand and contract arcuately around its hinge point in its spaced relationship from said top portion.

12. The combination as claimed in claim 11 further comprising:

said shelf having one portion thereof molded integrally with said hinge binding to provide a one piece injection molded case having said boxlike portion, said top, said depending wall brackets, and said shelf.

13. The combination as claimed in claim 12 further comprising:

reinforcement flanges for reinforcement of said depending wall brackets formed along the interior portion thereof.

* * * * *